United States Patent [19]
Peterson

[11] Patent Number: 4,789,288
[45] Date of Patent: Dec. 6, 1988

[54] ANTI-CROSS THREADING SCREW

[75] Inventor: Francis C. Peterson, Woodbury, Conn.

[73] Assignee: Buell Industries, Inc., Waterbury, Conn.

[21] Appl. No.: 34,010

[22] Filed: Apr. 2, 1987

[51] Int. Cl.$^4$ ............................................. F16B 35/00
[52] U.S. Cl. .................................... 411/386; 411/417; 411/426
[58] Field of Search ............... 411/386, 387, 417, 426; 408/224

[56] References Cited

U.S. PATENT DOCUMENTS

| 126,366 | 4/1872 | Wills | 411/387 |
| 3,438,299 | 4/1969 | Gutshall | 29/526 X |
| 3,724,315 | 4/1973 | Sygnator | 411/417 X |
| 4,486,135 | 12/1984 | Kazino | 411/417 X |
| 4,534,690 | 8/1985 | Barth | 411/386 |
| 4,630,985 | 12/1986 | Simons | 411/417 X |

FOREIGN PATENT DOCUMENTS

| 120691 | 12/1945 | Australia | 411/417 |
| 2913482 | 10/1980 | Fed. Rep. of Germany | 411/387 |
| 484671 | 5/1938 | United Kingdom | 411/386 |
| 2127927 | 4/1984 | United Kingdom | 411/386 |

Primary Examiner—Gary L. Smith
Assistant Examiner—Curtis B. Brueske
Attorney, Agent, or Firm—St. Onge Steward Johnston & Reens

[57] ABSTRACT

A screw having a tapered and offset tip with a partial thread prevents cross-threading of the screw when inserted into a nut. The offset tip is a section of a conical frustum. The axis of the conical frustum section is offset from the axis of the shank of the screw. The conical frustum section is defined by those portions of a conical frustum contained within the outer radius of the screw shank. The partial thread is located on the side of the tip facing the direction of offset of the tip.

9 Claims, 1 Drawing Sheet

ANTI-CROSS THREADING SCREW

FIELD OF THE INVENTION

The present invention relates to a screw which prevents cross threading when the screw is threaded into nuts and other internally threaded openings.

DESCRIPTION OF THE PRIOR ART

Screw threaded fasteners such as machine screws or bolts are typically used with nuts or are fitted into holes having a screw thread tapped into their bores. In many cases, such fasteners are not properly aligned with the nut or threaded hole before torque is applied to the fastener, causing cross threading of the fastener and the nut. Cross threading can damage the threads on both the fastener and the nut or threaded hole, causing the parts to seize together. When a fastener combination is seized, it will not tighten further, thus creating an insecure attachment and a variety of potential hazards such as the possibility of personal injury or damage to equipment. In addition, a seized fastener is difficult to disconnect, and the threads on the fastener and the nut or threaded hole will be damaged when the parts are disconnected. If a threaded hole in a metal part is involved, the threaded hole will usually need to be retapped before it is used, causing a loss of both time and money.

SUMMARY OF THE INVENTION

One object of the present invention is to provide a fastener or screw which prevents cross threading and its associated problems. More particularly, the present invention provides a screw which when inserted into a nut without being rotated will engage a plurality of nut threads so that the screw threads will be in phase with the nut threads such that when the screw is rotated it will thread smoothly into the nut.

This object, and other objects which will become apparent from the description which follows, are achieved by a device in accordance with the invention which comprises a screw having a head and a threaded cylindrical shank. The shank has a tapered and offset tip on one side on which a partial thread is formed. The tip is generally circular and frusto-conical, except that its axis is offset from the shank axis, and those portions of the circular substantially conical frustum which would extend beyond the shank outer radius are not present, leaving only a section of a circular substantially conical frustum. The tip is threaded only on the side of the tip towards which the axis of the conical frustum is offset.

The screw of the present invention operates to prevent cross threading because the unthreaded side of the tip slides over the internal threading of a nut when the screw is inserted into the nut, causing the partial threads of the screw tip to seat against the nut threads. The screw tip partial threads engage the nut threading, so that when the screw is rotated to advance it into the nut, the already engaged partial threads act as a leader or a guide which is already in phase with the nut threading, so that the threads on the cylindrical shank squarely thread into the nut without cross-threading.

DETAILED DESCRIPTION OF THE DRAWINGS

The invention will now be illustrated with reference to the drawings which show a particular embodiment of the anti-cross threading screw of the present invention.

Figure 1:
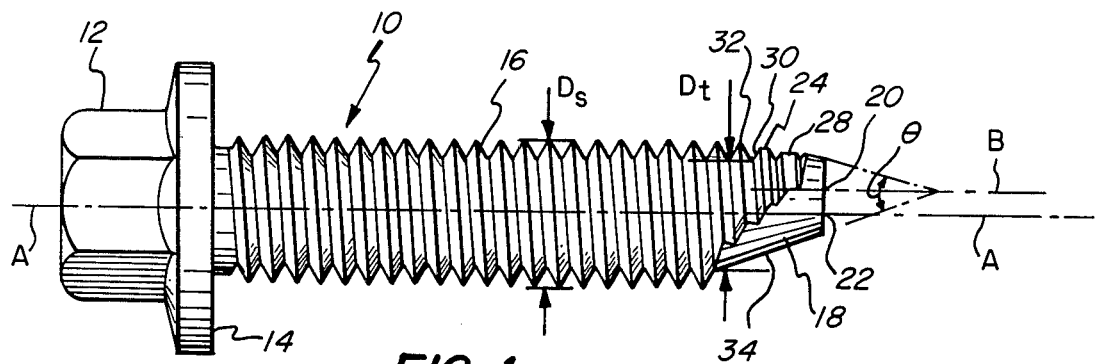
FIG. 1 is a side elevation view of a screw in accordance with the present invention.
Figure 2:
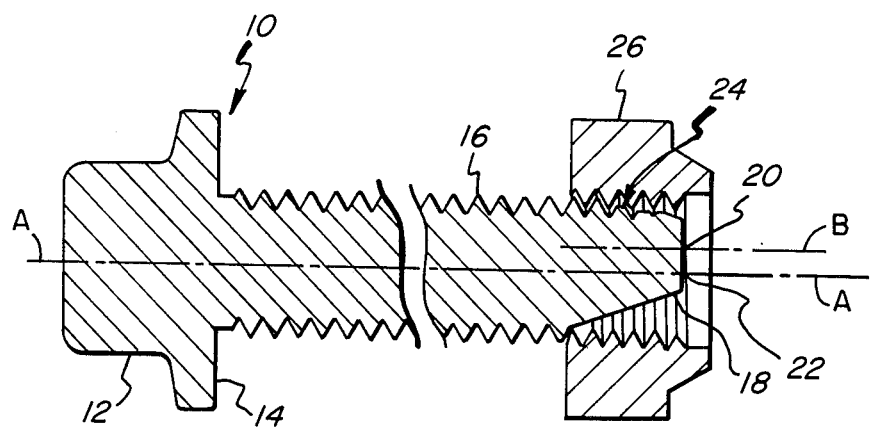
FIG. 2 is a cross sectional view of the screw of FIG. 1 inserted into a nut prior to tightening of the nut.
Figure 3:
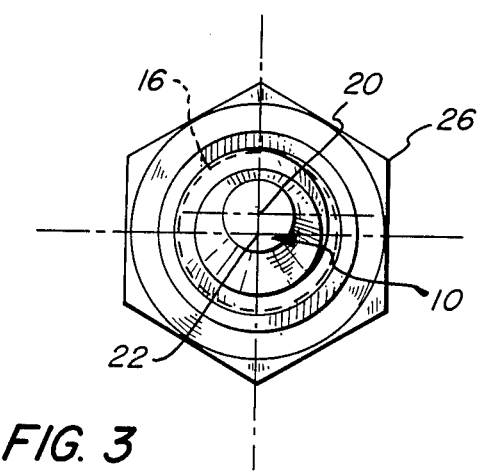
FIG. 3 is an end elevational view of the screw and nut of FIG. 2.

Referring to FIGS. 1 and 2, the screw, shown generally as 10, comprises a head 12 adapted to be engaged by a tool for applying rotational torque. For example, the head may be slotted to receive a flat or philips head screwdriver or may be formed as shown with a hexagonal shape in plan view to provide parallel flat areas for receiving a wrench. Head 12 has a load bearing area 14 that extends generally perpendicularly from the longitudinal axis A of the screw. Threaded cylindrical shank 16 projects perpendicularly from the load bearing area 14.

The tip 18 of the shank 16 is tapered and offset. Tip 18 comprises a section of a circular substantially conical frustum which has a centerpoint 20 on the axis B. The frustum is only a section of a complete frustum, as those portions of a complete frustum which would extend beyond the diameter $D_s$ of the screw are not present in the tip 18.

The centerpoint 20 of the tip 18 is centered on the axis B which is the axis of a vertex of an imaginary circular cone which would complete the section of a frustum which forms the tip 18. The centerpoint 20 is offset from the longitudinal axis A and the shank center 22 by a distance equal to between 2 and 45 percent of the diameter $D_s$ of the shank. The degree of offset is dependent on the vertex angle of the particular conical shape selected, and may be selected by one of ordinary skill in the art keeping in mind the need to provide on one side of the frustum a plurality of partial threads 24 which will engage a nut 26, as shown in FIG. 2 and as described below.

Preferably, the tip 18 is offset sufficiently so that partial threads 24 are provided along the entire side of the tip 18 that faces in the direction of the offset. In the preferred embodiment, the centerpoint 20 is offset from the longitudinal axis A by a distance equal to between about 10 to about 20 percent of the diameter $D_s$ of the shank 16.

The substantially conical frustum comprising the tip 18 may be a frustum of a right circular cone, the frustum of a non-right circular cone, or a paraboloid or hyperboloid of revolution. In the preferred embodiment, the tip 18 comprises the frustum of a right circular cone.

Screw 10 may be manufactured by methods which are well known, which typically involve a first step of forming an unthreaded screw blank by casting or extruding processes, and a second step of cutting thread on the screw blank by means of a die. The tip of the unthreaded screw blank corresponding to the tip 18 of the finished screw is cast or machined so that it forms a section of an offset conical frustum. Since the frustum is offset, the thread cutting step causes thread to be formed on only the side of the frustum which extends beyond the diameter $D_t$, the diameter of the shank at the valleys of the thread cuts, thereby creating the partial thread 24 and an unthreaded side 34.

The geometry of the manufacturing process will cause the partial thread 24 to be formed on the side of the tip 18 towards which the conical frustum which makes up tip 18 is offset.

It is to be appreciated therefore that the particular shape of the tip 18 may be selected from a variety of geometric and parabolic figures having a circular cross section so long as one side of the tip 18 will be smooth, and one side partially threaded, after the thread cutting step is performed. Such selection of a shape may be made by one of ordinary skill in the art.

The amount of partial thread 24 created by the cutting step should be within the following ranges: the first partial thread 28 adjacent the end of the tip 18 should cover between 4 and 20 percent of the circumferential length of the screw shank; the second partial thread 30 should cover between 10 and 40 percent of the circumferential length of the screw shank, and third partial thread 32 should cover between 20 and 70 percent of the circumferential length of the screw shank.

The screw prevents cross threading because, as shown in FIG. 2, the unthreaded side 34 of the screw 10 slides over the internal threading of a nut when the screw tip 18 is inserted into a nut, causing the partial threads 24 to seat against the nut internal threading. The screw is thus engaged on only one side with the, screw tip partial threads in phase with the nut threading. When the screw is rotated to tighten the screw and nut, the partial threads act as a leader or guide so that the main body of the threaded shank threads easily into the nut. Therefore, the fastener of the present invention provides a new screw which will prevent problems of cross threading.

I claim:

1. A screw, comprising:
   a head;
   a threaded shank projecting from said head, said shank having a tip at its axial end opposite said head, said tip comprising a section of a circular substantially conical frustum having a central axis which is offset from the central axis of said shank, said offset facing side having a partial thread formed thereon.

2. A screw in accordance with claim 1 wherein said section of a circular substantially conical frustum comprises a section of a right circular conical frustum.

3. A screw for preventing cross-threading, comprising:
   a head; and
   a cylindrical threaded shank projecting from said head, said shank having at its end opposite said head a circular substantially frusto-conical section having a central axis which is offset from the longitudinal axis of said shank.

4. A screw in accordance with claim 3 wherein said frusto-conical section is partially threaded on the side of said frusto-conical section facing the direction of said offset.

5. A screw in accordance with claim 3 wherein the centerpoint of said frusto-conical section is offset from the longitudinal axis of said shank by a distance equal to between 2 and 45 percent of the diameter of said shank.

6. A screw in accordance with claim 3 wherein the centerpoint of said frusto-conical section is offset from the longitudinal axis of said shank by a distance equal to between about 10 to about 20 percent of the diameter of said shank.

7. A screw in accordance with claim 4 wherein said partial threading comprises three partial threads.

8. A screw in accordance with claim 7 wherein said three partial threads comprise:
   a first partial thread located adjacent the end of said end having a circumferential length equal to between 4 and 20 percent of the circumferential length of said shank; and
   a second partial thread located adjacent said first partial thread and having a circumferential length equal to between 10 and 40 percent of the circumferential length of said shank; and
   a third partial thread located adjacent said second partial thread and having a circumferential length equal to between 20 and 70 percent of the circumferential length of said shank.

9. A screw for preventing cross-threading, comprising:
   a head; and
   a cylindrical threaded shank projecting from said head, said shank having at its end a partially threaded circular frusto-conical section, the centerpoint of said frusto-conical section being offset from the longitudinal axis of said shank by a distance equal to between about 10 to about 20 percent of the diameter of said shank.

* * * * *

UNITED STATES PATENT AND TRADEMARK OFFICE
Certificate

Patent No. 4,789,288                                          Patented December 6, 1988

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is Francis C. Peterson and Jeffrey Clifford.

Signed and Sealed this Seventh Day of March, 1989.

Abraham Hershkovitz,
*Petitions Examiner*
*Office of the Deputy Assistant*
*Commisssioner for Patents.*